C. VALL.
LENS FRONT MOUNT.
APPLICATION FILED DEC. 4, 1920.
1,396,388.
Patented Nov. 8, 1921.
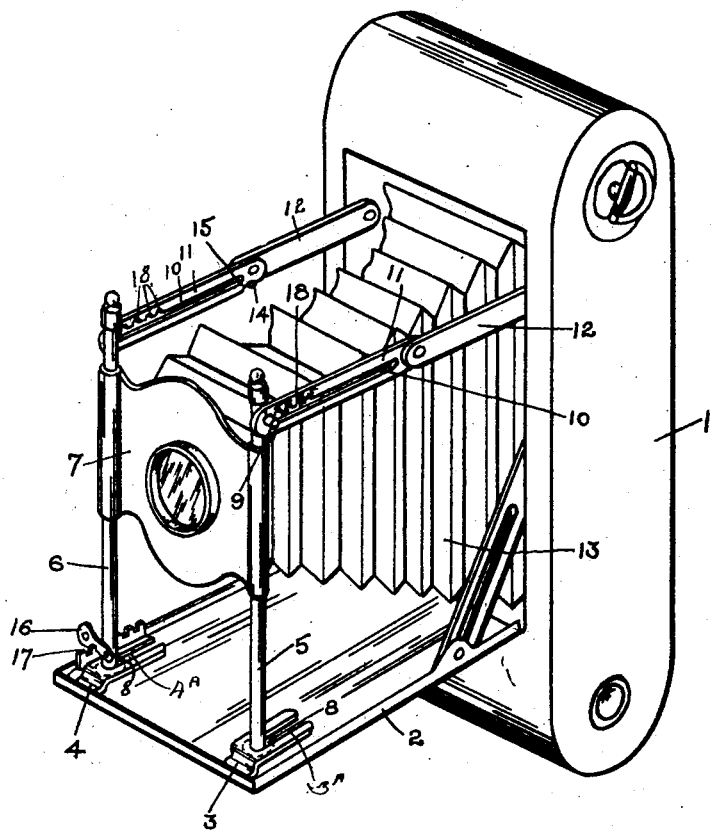
Carl Vall, Inventor
By Frank Keifer
Attorney.

UNITED STATES PATENT OFFICE.

CARL VALL, OF ROCHESTER, NEW YORK.

LENS-FRONT MOUNT.

1,396,388.     Specification of Letters Patent.     Patented Nov. 8, 1921.

Application filed December 4, 1920. Serial No. 428,335.

*To all whom it may concern:*

Be it known that I, CARL VALL, a subject of the King of Italy, residing at Rochester, in the county of Monroe and State of New York, have invented certain new and useful Improvements in Lens-Front Mounts, of which the following is a specification.

The object of this invention is to provide a new and improved form of lens front mount which is simple, strong and rigid in construction, takes out all lost motion and prevents any swaying of the lens front during the taking of pictures.

This and other objects of this invention will be fully illustrated in the drawing, described in the specification and pointed out in the claims at the end thereof.

In the accompanying drawing:

The figure shows a perspective view of a camera equipped with the improved form of lens front mount.

In the drawing, like reference numerals indicate like parts.

Cameras are made with a great variety of lens front mounts. While the more expensive cameras are equipped with lens front mounts that are rigid and strong, the smaller and cheaper cameras are at present being made with lens front mounts which do not, as a rule, hold the lens in a perfectly rigid position parallel to the focal plane, and in consequence thereof impair the quality of the pictures taken with the camera. In my present invention the lens front mount is made up of a very inexpensive structure which makes it adaptable to both high and low priced cameras and secures a very firm and strong mount for the lens front of these cameras.

In the drawing, reference numeral 1 indicates the body of the camera, at the front of which is mounted the usual type of bed plate 2. To the front of the bed plate are fastened a pair of spring clips 3 and 4. Each of these clips is bifurcated at its inner end as indicated at 3ᴬ and 4ᴬ respectively to receive one of the stems 5 and 6 of the lens front 7. Each of the stems 5 and 6 has a head 8 formed at the bottom thereof and the flange formed by this head is adapted to engage under the spring clip on either side of its bifurcation. The stems 5 and 6 with their heads are thus rigidly forced to the bottom of the bed plate 2 and are clamped in a perpendicular position thereon.

Near the top of each of the stems 5 and 6 that support the lens front 7 is provided a pin 9, which projects horizontally therefrom. These pins engage in the slots 10 formed in the links 11, on which they can slide in and out as will hereinafter be described. The inner end of each of the links 11 in turn is pivoted on the outer end of the links 12 that are mounted on the body of the camera, one on each side of the bellows 13 thereof. The links 11 and 12 are adapted to support or brace the upper ends of the stems 5 and 6 and between this support at the top of the stems and the support secured by the spring clips 3 and 4 at the bottom of the stems, the lens front 7, mounted between the stems 5 and 6, is held rigidly in place on the bed plate in a perfectly perpendicular position.

The links 11 and 12 fold together when the lens front is moved back. The pins 9, carried on the stems, move back in the slots of the links 11 and permit the doubling up of the two links in this way. When in the extended position shown in the figure the links are held horizontally by the lug 14, formed on the under side at the outer ends of the links 12. This lug snaps in place into a notch 15 cut into the under side of the link 11 near the inner end thereof and the engagement of the lug into the notch keeps the links 11 and 12 in perfect horizontal alinement. The slot 10 in each of the links 11 is provided with a short elongation which extends at right angles thereto at the outer end thereof. The pins 9 are adapted to engage into these elongations of the slots 10 so that the pins rest against shoulders that prevent their movement toward the rear until disengaged therefrom by the operator prior to the folding up or closing of the camera.

Near the bottom of the stem 6 is pivoted the indicator handle 16. This handle is adapted to engage into any of the notches 17 provided on one side of the spring clip 4. These notches are calibrated to indicate the desired position of the lens front on the bed plate for the taking of pictures of objects located at predetermined distances from the camera. The slot 10 in each of the links 11 is provided with a series of notches 18 which are spaced thereon corresponding to the spacings between the notches 17 in the spring clip 4. These notches engage the pins 9 and fasten the stems at the top. The stem 6 may thus be held in a perpendicular position both at the bottom and the top by engaging the indicator 16 at the bottom of the stem in the desired notch 17 and the pin 9 at the top of the stem in the corresponding notch 18. The adjustment of the lens front mount can thus be adjusted to change the focus of the camera.

It will be seen from an inspection of the drawing that when the post or upright 6 is fastened in place in the clip 4 at a predetermined point by means of the lever 16, the pin 9 provided at the top of the upright is adapted to engage in the corresponding notch 18 in the link 11, it being understood that the spacing of the notches in the spring clip 4 is the same as that of the notches 18 in the links 11. When, therefore, the upright 6 is held in place adjacent to the second notch provided in the spring clip 4, the upper ends of both of the uprights 5 and 6 are to be held in place on the links 11 through their engagement with the second one of the notches provided in these links. In this way the lens front is held perfectly perpendicular on the bed plate of the camera.

I claim:

1. In a lens front mount for cameras the combination of a bed plate, a lens front, a pair of uprights adapted to support said lens front on said bed plate, a pair of bifurcated spring clips mounted on said bed plate, said uprights being adapted to engage said spring clips and be held rigidly in place on said bed plate by said spring clips.

2. In a lens front mount for cameras the combination of a body, a bed plate provided on said body, a lens front, a pair of uprights adapted to support said lens front, a pair of spring clips mounted on said bed plate, said uprights being adapted to engage said spring clips to hold said uprights rigidly in place on said bed plate at the bottom thereof, links connected between the top of said uprights and the body of the camera to brace or support the top of said uprights.

3. In a lens front mount for cameras the combination of a bed plate, a pair of bifurcated spring clips mounted on said bed plate, a pair of uprights, a head formed at the bottom of each of said uprights, said uprights being adapted to engage into the bifurcation of said spring clips, said spring clips being adapted to yieldingly hold said heads of said uprights against said bed plate and support said uprights in a perpendicular position thereon, and a lens front carried between said uprights.

4. In a lens front mount for cameras the combination of a body, a bed plate, a pair of bifurcated spring clips mounted on said bed plate, a pair of uprights, a head formed at the bottom of each of said uprights, said uprights being adapted to engage into the bifurcation of said spring clips, said spring clips being adapted to yieldingly hold said heads of said uprights on said bed plate and support said uprights in a perpendicular position thereon, a lens front carried between said uprights, and links spaced between the top of said uprights and the body of the camera to support the top of said uprights.

In testimony whereof I affix my signature.

CARL VALL.